United States Patent
Davison

(10) Patent No.: US 12,250,951 B2
(45) Date of Patent: Mar. 18, 2025

(54) THERMAL AND MOISTURE-RESISTANT EDIBLE CONTAINER AND METHOD OF MAKING THE SAME

(71) Applicant: AMAI, LLC, Carlsbad, CA (US)

(72) Inventor: Jeannine M. Davison, Carlsbad, CA (US)

(73) Assignee: AMAI, LLC, Carlsbad, CA (US)

( * ) Notice: Subject to any disclaimer, the term of this patent is extended or adjusted under 35 U.S.C. 154(b) by 68 days.

(21) Appl. No.: 17/833,727

(22) Filed: Jun. 6, 2022

(65) Prior Publication Data

US 2023/0389557 A1 Dec. 7, 2023

(51) Int. Cl.
*A21D 13/48* (2017.01)
*A21D 8/06* (2006.01)

(52) U.S. Cl.
CPC .............. *A21D 13/48* (2017.01); *A21D 8/06* (2013.01)

(58) Field of Classification Search
CPC ....... A23P 30/10; A21D 13/48; A21D 13/047; C08L 3/02; B65D 65/46; Y02A 40/90; Y02W 90/10
USPC ......................................................... 426/138
See application file for complete search history.

(56) References Cited

U.S. PATENT DOCUMENTS

2018/0016750 A1* 1/2018 Lauria .................... D21H 27/10
2019/0183132 A1 6/2019 Zapryanov

FOREIGN PATENT DOCUMENTS

CN 112956540 A 6/2021
WO WO-2020208645 A1 * 10/2020

OTHER PUBLICATIONS

Fukuda H JP-2002325542-English abstract (Year: 2002).*
International Search Report in PCT/US2023/023020, mailed Aug. 30, 2023, 2 pages.

* cited by examiner

*Primary Examiner* — Subbalakshmi Prakash
(74) *Attorney, Agent, or Firm* — ARENTFOX SCHIFF LLP

(57) ABSTRACT

An edible container made of upcycled spent brewers grain, upcycled oat protein, and starch. A dough containing the upcycled spent brewers grain, the upcycled oat protein, and the starch is placed in a mold and baked under high heat, and high pressure conditions to form an upcycled, nutritious, edible container that can hold hot liquids, including boiling liquids, for extended periods of time without degrading, and without the addition of a separate coating.

19 Claims, 2 Drawing Sheets

THERMAL AND MOISTURE-RESISTANT EDIBLE CONTAINER AND METHOD OF MAKING THE SAME

FIELD OF THE INVENTION

The present invention relates to edible containers for holding liquids for consumption. Specifically, the present invention relates to edible container made from upcycled ingredients, and that are capable of withstanding hot liquids, like boiling water, for extended periods of time, while maintaining structural integrity and not leaking.

BACKGROUND OF THE INVENTION

Disposable cups made from plastics or plastic lined paper are a commonly used alternative to reusable drinking cups for their low cost and convenience. Both plastic and paper cups can hold hot liquids for extended periods of time. However, disposable cups are not good for the environment. Because they are not biodegradable, they litter the environment or fill landfills. In addition, the plastics used in disposable cups are derived from fossil fuels.

Edible cups are an alternative to disposable cups, and are better for the environment. Edible cups do not produce the harmful waste of disposable cups because they are eaten or quickly biodegrade if discarded. The most common types of edible cups are made from baked dough or batter, and are made by, for example, pouring batter into a mold and then baking, or forming dough around a mandrel and then baking.

However, these types of edible cups cannot hold liquids for extended periods of time because they are not waterproof. One solution to this problem is to coat the baked cup with a waterproof layer. U.S. Pat. No. 6,068,866 to Petrini discloses an edible cup made of a twice baked pastry with a waterproof layer made of sugar, water, starch, and gum that is capable of containing hot and cold drinks without leaking or losing its structural integrity. However, this additional layer requires an added coating process, the cups are still limited to the structural integrity of baked dough, and the time period that such cups can hold hot liquids is limited and relatively short.

Another type of edible cup is made from dehydrated fruits or vegetables. U.S. Pat. No. 6,423,357 to Woods discloses an edible container made of dehydrated fruits or vegetables formed into strips and wrapped around a mandrel. However, dehydrated fruits and vegetables are susceptible to rehydration when in contact with a liquid. Additionally, cups such as these suffer from both the strength limitations of the dehydrated fruits or vegetables and the difficulty in forming the dehydrated material into a cup shape.

Another problem with some conventional edible containers is that they must be continuously supported. That is, a user cannot set the container in an upright position on a flat surface.

Additionally, most conventional edible containers are made from virgin grains, not recovered food assets acquired through upcycling. Virgin grains require use of precious diminishing resources such as fertile land and water to cultivate and grow, which have a negative impact on the environment.

Accordingly, there is a need for an improvement over existing disposable containers.

SUMMARY OF THE INVENTION

The present invention is directed to an upcycled edible container that can hold and contain hot and cold liquids for extended periods of time.

In a general aspect of the present invention, an edible container is comprised of brewers spent grain, upcycled oat protein, and starch. In this aspect, the brewers spent grain comprises 13% to 17.5%, upcycled oat protein comprises 11.6% to 13.8%, and starch comprises 6.1% to 10.4% by weight of the edible container.

In another general aspect of the present invention, a method is provided for creating an edible container. This method comprises: (1) forming a dough by mixing ingredients that include water, 13% to 17.5% by weight of brewers spent grain, 11.6% to 13.8% by weight of upcycled oat protein, and 6.1% to 10.4% by weight of starch; (2) placing the dough into a baking mold; and (3) baking the dough to form the edible container.

In another aspect of the present invention the edible container further comprises unbleached flour, sugar, fat, and salt. Preferably, the unbleached flour has a concentration of 35.6% to 63% by weight, the sugar has a concentration of 9.2% to 12.4% by weight, the fat has a concentration of 4.8% to 5.5% by weight, and the salt has a concentration of 0.3% to 0.8% by weight.

In another aspect of the present invention, the upcycled oat protein within the edible container is oat milk flour, and the oat milk flour preferably contains around 20% fiber and 50% protein.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects of the present invention are described herein. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the exemplary aspects as illustrated in the accompanying drawings. The same reference indicators will be used to the extent possible throughout the drawings and the following description to refer to the same or like items.

The invention is directed to an edible and biodegradable container, made with upcycled grains, that can hold hot or cold liquids for extended periods of time. The container can be easily molded into different shapes and sizes, and does not require a separate coating process to increase the time period for maintaining structural integrity when exposed to liquid. The container is made essentially of natural materials that are safe to eat and is a delicious alternative to disposable containers destined for the landfill. The container can be eaten as the contents it contains are ingested. The edible container can be used at parties and events in place of disposable containers or in other situations where disposable containers would normally be used or additional nutrition is desirable.

Figure 1:
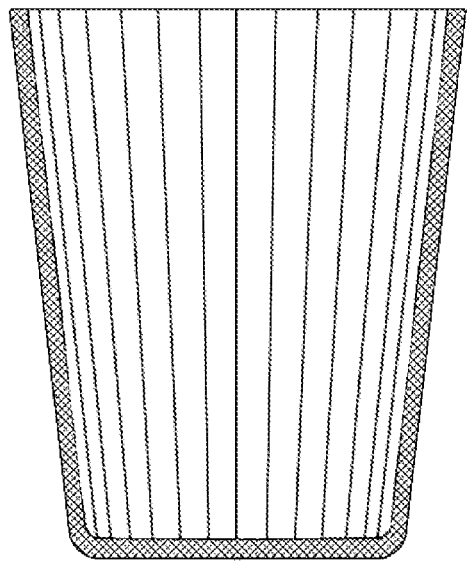
FIG. 1 is a side view of an edible container according to an embodiment of the present invention.
Figure 2:
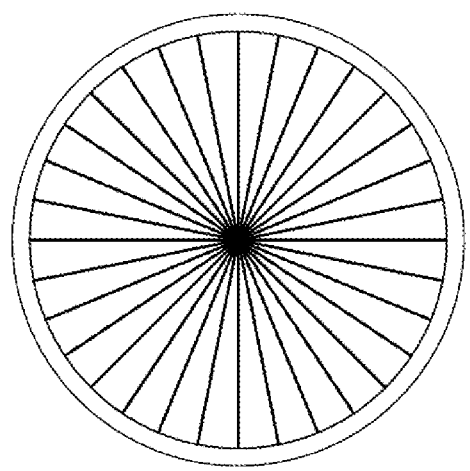
FIG. 2 is a top side view of the edible container shown in FIG. 1.

The edible container, an example of which configured as a drinking cup is shown in FIGS. 1 and 2, is made of brewers spent grain, upcycled oat protein, and starch. The starch is preferably selected from wheat starch, potato starch, tapioca starch, corn starch, arrowroot starch, or the like. The edible container also may further comprise unbleached flour, sugar, fat, and salt. The fat is preferably selected from partially hydrogenated vegetable oils, coconut oil, palm kernel oil, avocado oil, olive oil, grapeseed oil, sunflower oil, almond oil, hemp seed oil, hazelnut oil, butter, or the like.

In a preferred embodiment, the brewers spent grain has a fiber fraction of 40 to 60% and a protein fraction of 20 to 30% of a total of the brewers spent grain, and the upcycled oat protein is preferably oat milk flour. Essential amino acids may constitute approximately 30% of the total protein in the brewers spent grain.

Additionally, the brewers spent grain preferably contains a considerable quantity of vitamins, including folic acid, niacin, biotin, thiamine, choline, pantothenic acid, riboflavin, and pyridoxine, as well as tocochromanols such as tocotrienols and tocopherols (commonly known as vitamin E). Preferably, the most abundant minerals in the brewers spent grain are calcium (at e.g., 3600 mg/kg), magnesium (at e.g., 1900 mg/kg), phosphorus (at e.g., 6000 mg/kg), and (at e.g., 2900 mg/kg), and sodium (at e.g., 137 mg/kg). Other minerals present in the brewers spent grain may include iron, copper, potassium, and manganese.

The brewers spent grain is preferably low in carbohydrates, and most of the sugars are removed during the mashing process for fermentation of the initial brewers grain. As a result, the brewers spent grain preferably has 12× fiber, 2× protein, and ⅓ of the carbohydrates compared to standard all-purpose flour. The brewers spent grain yields a malt brown color when baked, and has a nutty, caramel, almond flavor.

In a preferred embodiment, the upcycled oat protein is oat milk flour. Oat milk flour is a high protein, high fiber, and gluten-free product, made from the nutritious oat pulp leftover from oat milk production. It yields a light tan color, and an oaty, slightly sweet, butterscotch flavor when baked.

The oat milk flour preferably comprises approximately 20% fiber, and nearly 50% protein.

In a typical embodiment, the edible container comprises 18% to 30% by weight of the brewers spent grain, 7% to 13% by weight of the upcycled oat protein; and 5% to 7% by weight of starch.

In a preferred embodiment, the total weight of the brewers spent grain and the upcycled oat protein is 26% or more by weight of a total weight of the edible container, preferably from 26% to 77%, most preferably from 26% to 35%. In a further embodiment, the unbleached flour noted above can be excluded and replaced with an additional percentage of the brewers spent grain and the upcycled oat protein. In such a further embodiment, the total weight of the brewers spent grain and the upcycled oat protein could be 77% or less by weight of a total weight of the edible container.

In another preferred embodiment, the ratio of the brewers spent grain to oat protein is approximately 11:9.

Unlike other edible containers that require a coating to be resistant to liquids, the edible container of the present invention uses a combination of ingredients and baking under high heat and pressure to achieve its moisture resistant barrier properties by creating a glass-like structure. As used herein a "glass-like structure" is a crystalline structure resulting from the combination of pressure, heat, and steam that causes a chemical reaction between the lignin and hemicelluloses in the brewers spent grain. To achieve structures with sufficiently high crystallinity, and therefore, glass-like properties, baking temperatures between 356° F. and 392° F. are most preferred, with moisture levels of the finished edible container of preferably less than or equal to 10%.

Figure 3:
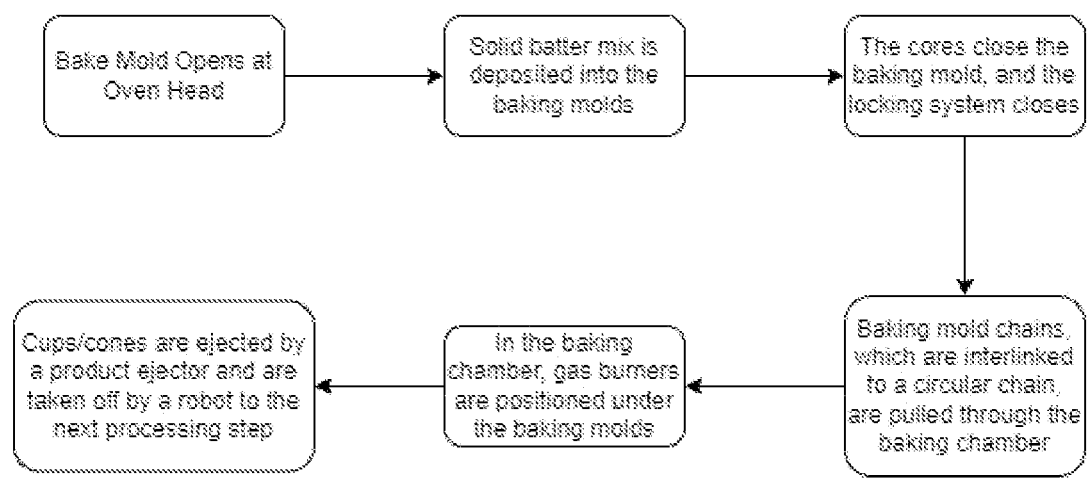
FIG. 3 is a flow chart showing a manufacturing process according to a preferred embodiment of the present invention.

A method of forming the edible container will now be described with reference to the flowchart in FIG. 3. First, a dough is formed by mixing ingredients that include water, 25% to 35% by weight of brewers spent grain, 9.7% to 20% by weight of upcycled oat protein, and 4.5% to 6.5% by weight of starch. The dough can also include unbleached flour at a concentration of 28% to 40% by weight, sugar at a concentration of 6% to 8% by weight, fat at a concentration of 3.3% to 4% by weight, and salt at a concentration of 0.2% to 0.5% by weight. As noted above, if the unbleached flour is excluded and replaced with an additional percentage of the brewers spent grain and the upcycled oat protein. In such a further embodiment, the total weight of the brewers spent grain and the upcycled oat protein could be as high as 58% by weight of a total weight of the dough.

Next, the dough is made into an appropriately sized ball and placed into a baking mold. This process is referred to as "dosing." For example, for a 100 ml cup, the dosing ranges from 28 grams to 30 grams. Overdosing occurs when the mass of the dough ball is above this range, resulting in too great of a pressure in the mold, creating large holes in the cup and dough blowing out of the mold. Underdosing occurs when the mass of the dough ball is below this range, resulting in an underfilled mold cavity and an under-formed cup. As one skilled in the art will appreciate, the shape of the baking mold substantially corresponds to the desired finished shape of the edible container, and the amount of dough used is selected based on the shape and size of the mold.

Once in the mold, the dough is baked under high heat and high pressure to form the edible container. Preferably, temperature of baking ranges from 356° F. to 392° F., the pressure ranges from 90 to 120 psi, and the baking time ranges from 150 to 180 seconds. This high heat, high pressure process used to form the edible container effectively transforms components in the spent brewers grain, such as hemicellulose, cellulose, and lignin, into a glass-like structure. This glass-like structure that is formed allows the edible container to hold liquids without structural degradation and resultant leaking for up to twenty-four hours, and provides a structure that holds hot liquids having an initial temperature of 185° F. to 212° F. for at least 4 hours, and preferably for at least 24 hours, before degradation of the structural integrity of the edible container to a point where liquid can no longer be held therein. The finished edible container preferably has a moisture level of less than or equal to 10%.

FIG. 1 is a side view and FIG. 2 is a top side view of a formed edible container according to a preferred embodiment of the present invention. While the foregoing has been described in conjunction with an exemplary embodiment, it is understood that the term "exemplary" is merely meant as an example. Those skilled in the art can appreciate from the foregoing description that the present invention can be implemented in a variety of forms. For example, the dough and corresponding mold described herein can be used to create a variety of edible and degradable items such as kitchen utensils (forks, spoons, knives, etc.), drinking straws, travel covers for the containers, plates, and the like.

Therefore, while the embodiments of this invention have been described in connection with particular examples thereof, the true scope of the embodiments of the invention should not be so limited since other modifications and variations will become apparent to the skilled practitioner upon a study of the present specification. Such modifications and variations are considered to be within the purview and scope of the appended claims and their equivalents.

The invention claimed is:

1. An edible container comprising: 13% to 17.5% by weight of brewers spent grain; 11.6% to 13.8% by weight of upcycled oat protein; and 6.1% to 10.4% by weight of a starch.

2. The edible container of claim 1, wherein a total weight of the brewers spent grain and the upcycled oat protein is 26% or more by weight of a total weight of the edible container.

3. The edible container of claim 1, wherein a ratio between the brewers spent grain and the upcycled oat protein is approximately 11:9.

4. The edible container of claim 1, further comprising unbleached flour, sugar, fat, and salt.

5. The edible container of claim 4, wherein the unbleached flour has a concentration of 35.6% to 63% by weight, the sugar has a concentration of 9.2% to 12.4% by weight, the fat has a concentration of 4.8% to 5.5% by weight, the salt has a concentration of 0.3% to 0.8% by weight.

6. The edible container of claim 1, wherein the brewers spent grain has a fiber fraction of 40 to 60% and a protein fraction of 20 to 30% of a total of the brewers spent grain.

7. The edible container of claim 1, wherein the upcycled oat protein comprises oat milk flour.

8. The edible container of claim 1, wherein the oat milk flour is 20% fiber and approximately 50% protein.

9. The edible container of claim 1, wherein the container is able to contain liquids ranging in an initial temperature of 185° F. to 212° F. for at least 4 hours before degrading.

10. A method of making an edible container, the method comprising:
forming a dough by mixing ingredients that include water, 13% to 17.5% by weight of brewers spent grain, 11.6% to 13.8% by weight of upcycled oat protein, and 6.1% to 10.4% by weight of a starch;
placing the dough into a baking mold; and
baking the dough to form the edible container.

11. The method of making the edible container of claim 10, wherein a total weight of the brewers spent grain and the upcycled oat protein is 26% or more by weight of a total weight of the edible container.

12. The method of making the edible container of claim 10, wherein a ratio between the brewers spent grain and the upcycled oat protein is approximately 11:9.

13. The method of making the edible container of claim 10, wherein the dough further comprises unbleached flour, sugar, fat, and salt.

14. The method of making the edible container of claim 13, wherein the unbleached flour has a concentration of 35.6% to 63% by weight, the sugar has a concentration of 9.2% to 12.4% by weight, the fat has a concentration of 4.8% to 5.5% by weight, the salt has a concentration of 0.3% to 0.8% by weight.

15. The method of making the edible container of claim 10, wherein the brewers spent grain has a fiber fraction of 40 to 60% and a protein fraction of 20 to 30% of a total of the brewers spent grain.

16. The method of making the edible container of claim 10, wherein the upcycled oat protein is oat milk flour.

17. The method of making the edible container of claim 10, wherein the oat milk flour is 20% fiber and approximately 50% protein.

18. The method of making the edible container of claim 10, wherein the container is able to contain liquids ranging in an initial temperature of 185° F. to 212° F. for at least 4 hours before degrading.

19. The method of making the edible container of claim 10, wherein the baking of the dough is conducted under a pressure and temperature sufficient to form the dough into a glass-like structure.

* * * * *